US007707505B1

(12) United States Patent
Ohrt et al.

(10) Patent No.: US 7,707,505 B1
(45) Date of Patent: Apr. 27, 2010

(54) DYNAMIC TABS FOR A GRAPHICAL USER INTERFACE

(75) Inventors: Curtis K. Ohrt, Redwood City, CA (US); Michael R. Martin, San Mateo, CA (US); Xiaofeng Ma, Walnut Creek, CA (US); Robert J. Dugan, San Jose, CA (US); Steven Horio, Mountain View, CA (US); Sridhar Gunapu, Sunnyvale, CA (US); Deepankar Narayanan, Santa Clara, CA (US)

(73) Assignee: InsWeb Corporation, Gold River, CA (US)

( * ) Notice: Subject to any disclaimer, the term of this patent is extended or adjusted under 35 U.S.C. 154(b) by 1826 days.

(21) Appl. No.: 09/534,647

(22) Filed: Mar. 23, 2000

(51) Int. Cl.
  *G06F 3/00* (2006.01)
(52) U.S. Cl. ..................................................... 715/738
(58) Field of Classification Search ................ 715/738; 707/3, 505, 906, 501.1, 507; 345/968
  See application file for complete search history.

(56) References Cited

U.S. PATENT DOCUMENTS

| 5,897,622 | A | * | 4/1999 | Blinn et al. | ............. | 705/26 |
| 6,023,684 | A | | 2/2000 | Pearson | ............. | 705/35 |
| 6,141,006 | A | * | 10/2000 | Knowlton et al. | ............. | 345/835 |
| 6,199,099 | B1 | * | 3/2001 | Gershman et al. | ............. | 345/966 |
| 6,424,360 | B1 | * | 7/2002 | Torres | ............. | 345/810 |

OTHER PUBLICATIONS http://www.insuremarket.com; QuickenInsurance—life and auto insurance quotes; pp. 1, 2; Mar. 19, 2000.
http://ww.ecoverage.com; Ecoverage, Copyright 2000, eCoverage P&C Insurance Services, Inc., p. 1, Mar. 19, 2000.
https://www.esurance.com/default.asp?&XZO=XZO &ZZZESURANCESESS.../default.asp&ZZZCOOKIFID=4011; esurance, Copyright 2000 e-Surance™ all rights reserved; p. 1, Mar. 19, 2000.
http://quickenloans.quicken.com/; Quicken.com, p. 1; Mar. 19, 2000.
Http://www.eloan.com/; E-Loan, p. 1, Mar. 19, 2000.
http://wwwamazon.com/exec/obid_s/subst/home/home.html/102-8347878-94680; Amazon.com, p. 1, 2; Mar. 19, 2000.

\* cited by examiner

*Primary Examiner*—Stephen S Hong
*Assistant Examiner*—Le Nguyen

(57) ABSTRACT

A dynamic, intelligent user interface for an on-line, virtual application whereby user input customizes the subsequent display of application data and queries presented to the user/applicant. The present invention includes a facility for intelligent editing, data state presentation, and error flagging and correction. In one embodiment of the present invention, the intelligent user interface is implemented as part of a series of dynamically generated web pages (a form set) presented to a user of an ecommerce Internet web site. This presentation is in the form of a collection of tabbed panes of data, the selected pane being displayed on a web page, wherein each pane contains one or more pages of data and queries. This organization and presentation of the virtual application provides re-entrant editing; error trapping, flagging, and correction; and easy navigation from sub-pane to sub-pane (page to page) within each pane and from pane to pane using the tabs and conventional browser Back and Forward button functionality.

24 Claims, 22 Drawing Sheets

⇢)INSWEB
*Where You And Your Insurance Really Click*

Have Questions?
See our Live Help Options

Start | State | ... | ... | Usage | Discounts | Coverage | Quotes

To shop for quotes, take 15-20 minutes to:

| Enter Your Information | Review Your Quotes* | Compare Features and Benefits | Choose Companies and Send Your Information |

Note:

- Your current policy and vehicle registration can help you complete the process more quickly.
- We will prefill some answers using our own data sources or with information you've previously entered. You can change this information at any time.

To begin, answer the question below:

In which state would you like to insure your vehicle? | California ▼ |

Check here to save your information ☐

[Continue]

* Your personal information and the number of participating <u>quoting companies in your state</u> will determine how many quotes you receive.

We take your privacy seriously. Click on the TRUSTe logo for our Privacy Policy.

Copyright, Legal Notices and Licenses   InsWeb is a service operated by InsWeb Insurance Services, Inc. InsWeb Insurance Services, Inc. is licensed as an insurance agent.

*FIG. 6*

Driver Summary

| No. | Name | Date of Birth | Relationship | Licensed State | Residence State | Change | Delete (required) |
|---|---|---|---|---|---|---|---|
| 1 | Steve | 11/16/1958 | Self | CA | CA | Change | |
| 2 | Jamie | 01/10/1960 | Spouse | CA | CA | Change | Delete |

Add Another Driver

Add any additional licensed drivers living in household    Add

Check here to save your information ☐

Vehicle #1 Info

Vehicle Information

1989 Toyota, Long Bed Deluxe 4WD    [Change]

Purchase and Finance Information

Date purchased/leased: MM [03] / YYYY [1992]

Cost new (approximate): $ [17800] .00

Term length if financed or leased: [N/A - wholly owned ▼]

Registration Information

Registered to: [Self ▼]

Registered state: [California ▼]

City where parked overnight (must be in CA): [San Jose]

Zip Code where parked overnight (must be valid for City): [95131]

Garage type: [Full Garage ▼]

Special Vehicle Considerations

Manufactured for use outside US; Considered a classic; Custom equipment modifications; Extensive unrepaired damage; Has vehicle ever been stolen:    ○ Yes   ● No

Special Equipment

Canopy/Camper Tops; Custom Painting; Special Wheels/Rims; Stereo equipment over $350; Custom Body Work; Van Modifications; Winch    ○ Yes   ● No

Additional Equipment

Security System: [Alarm Only ▼]

4 wheel drive: ● Yes   ○ No

Anti-lock brakes: [All-wheel Anti-Lock ▼]

Automatic seat belts: ● Yes   ○ No

Airbags: [Driver's and Passenger's Side Only ▼]

Check here to save your information ☐

> INSWEB®
> Where You And Your Insurance Really Click
>
> Have Questions? See our Live Help Options — Live Help
>
> Start | State | Drivers | Vehicles | Usage | Coverage | Discounts | Quotes
>
> Quoting Companies - These companies are prepared to offer you quotes.

- Uncheck the box in the "Quote Me" column if you do not want a quote from a particular company.
- Select an agent from the drop-down box that may appear underneath a company to receive a quote.

| Click on logo for company details | A.M. Best | Quote Me |
|---|---|---|
| AARP Auto Insurance Program from The Hartford | AA/A+ | ☑ |
| TravelersInsurance — A member of citigroup | NR/A+ | ☑ |
| CSE Insurance Group | N/A/A- | ☑ |
| Nationwide Insurance | AA/A+ | ☑ |
| State Farm Insurance Companies — Like a good neighbor, State Farm is there® | AAA/A++ | ☑ |

Select an agent from the list below to receive a quote from State Farm:

[ Select... ▼ ]

| | | |
|---|---|---|
| Kemper® Insurance Companies | A/A+ | ☑ |
| GE Financial Network | AA/A- | ☑ |
| Orion Auto | A/A | ☑ |
| Financial Indemnity Company | N/A/A++ | ☑ |
| 21st Century Insurance Company | A+/A | ☑ |
| GMAC Insurance | Apl/A+ | ☑ |
| Reliance National | A/A- | ☑ |
| Explorer Insurance Company | NR/A | ☑ |
| CNA — For All the Commitments You Make® | A/A+ | ☑ |
| RelianceDirect | A/A- | ☑ |

DYNAMIC TABS FOR A GRAPHICAL USER INTERFACE

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present invention relates generally to computers and, more particularly, to computer-implemented systems for interfacing with application forms over on Internet or intranet.

2. Description of the Related Art

Computer systems are routinely used to generate insurance quotes based on information provided by the insured. The information that is provided by the insured varies depending on both the subject of the insurance policy to be underwritten and the type of coverage desired. For instance, in the case of automobile insurance the information provided by the insured includes information about the vehicle or vehicles to be covered under the policy, the driver or drivers to be covered under the policy, and the type of coverage requested by the insured.

Since insurance quotes are typically based on statistical data which is correlated to the information provided by the insured, computers can greatly reduce the time and expense associated with generating insurance quotes. In particular, computer quoting systems allow insurance agents to provide accurate quotes to potential clients in a matter of minutes by inputting the client's information into the system and automatically generating quotes based on the information provided by the client.

The increasing popularity of the Internet and the World Wide Web (the web) have led to the development of automated insurance quoting systems that are accessible directly over the web. Operation of one such system is illustrated in FIG. 1. In automated insurance quoting operation 100 of FIG. 1, a computer program is first executed in stage 110, whereby information is collected from a user of a client computer connected to a server computer via the Internet. The information collected in stage 110 varies accordingly to the type of insurance quote requested by the user (e.g., automobile, homeowner, life, health) and may include information about the user (e.g., name, address, date of birth), information about the subject of the insurance policy to be underwritten (e.g., automobile information for auto insurance, medical history for health insurance) and information about the type of coverage requested (e.g., deductible amount, maximum liability). In stage 120, the computer program evaluates the information provided by the user and generates a number of insurance quotes by comparing the information provided by the user with insurance rate information provided by insurance carriers.

A quote pad page is then presented to the user in stage 130. The quote pad page contains information about both on-line and off-line quotes available to the user. On-line quotes can be presented directly to the user by the computer program, while off-line quotes are sent to the user by alternate means such as e-mail or regular mail at a later time. In stage 150, the user elects whether to receive off-line quotes, in which case operation 100 proceeds to stage 152. Otherwise, if the user elects to receive on-line quotes, operation 100 proceeds to stage 190.

In addition, during stage 130, the user can opt to save the information already entered for use at a later time by accessing an account creation page in stage 140.

In stage 152, off-line quoting, the user enters additional personal contact information. Stage 154 then determines whether any agents are able to provide a quote to the user, in which case operation 100 proceeds to stage 160; otherwise operation 100 proceeds to stage 170. In stage 160, an agent selection page is presented to the user. The user then selects an agent from whom to receive an off-line quote. The user information is then sent to the selected agent who, in turn, sends a quote to the user, typically, by mail.

In case the user elects to receive on-line quotes from companies that do not require agents to present quotes, a page displaying the quote details is presented to the user in stage 190. If the user then elects to request coverage, personal contact information is entered by the user in stage 195 and forwarded to the quoting insurance company for further processing of the insurance application. Operation 100 then proceeds to stage 170.

Finally, in stage 170, a thank you page is presented to the user summarizing the quotes presented and providing the user with a further option for storing the information entered by accessing the account creation page in stage 180.

This system, however, presents some limitations. The process used in the prior art to fill out the application is essentially linear, and this has caused some confusion among applicants and users of the system who want to make changes in information already entered. Specifically, those wishing to comparison shop for insurance covering a variety of situations (for example, different drivers or cars on an automobile policy or different residence locations on a homeowners policy) have been frustrated by having to re-enter all or part of the information required in the application.

Furthermore, the common convenience of the "Back" and "Forward" buttons (provided in all well-known Internet browsers) generally does not function properly when filling in on-line forms. Information is often lost when attempting to use the Back and Forward buttons to navigate within a multi-page virtual (on-line) form, particularly when using so-called "secure" forms such as those commonly employed in on-line ecommerce transactions.

What is needed is an intelligent on-line application form set that automatically configures itself, the questions it asks, and the data it displays in response to user/applicant input. Such an intelligent on-line application must also properly trap and handle user errors. Such trapping should include alert the user in a timely manner and provide an easy way to correct all errors.

Such an intelligent application would better personalize the on-line application process. It should allow easy navigation between arbitrary web pages and/or sections of the virtual application, including conventional use of browser Back and Forward navigation button functions.

SUMMARY

A dynamic, intelligent user interface for an on-line (virtual) application whereby user input customizes the subsequent display of application data and queries presented to the user/applicant. The present invention includes, in some embodiments, a facility for intelligent editing, data state presentation, and error flagging and correction. In one embodiment of the present invention, the intelligent user interface is implemented as part of a series of dynamically generated web pages (a form set) presented to a user to an ecommerce Internet web site. This presentation is in the form of a collection of tabbed panes of data, the top-most selected pane being displayed on a web page, wherein each pane contains one or more pages of data and queries. This organization and presentation of the virtual application provides a means for re-entrant editing; error trapping, flagging, and correction; and easy navigation from sub-pane to sub-pane (page to page) within each pane and from pane to pane using the tabs and conventional browser Back and Forward button functionality.

BRIEF DESCRIPTION OF THE DRAWINGS

The present disclosure may be better understood and its numerous features and advantages made apparent to those skilled in the art by referencing the accompanying drawings.

FIGS. 6, 7, 8, 9, 10, 11, 12, 13, 14, 15, and 16 are screen shots of the various panes and sub-panes of an intelligent user interface according to one embodiment of the present invention.

The use of the same reference symbols in different drawings indicates similar or identical items.

DETAILED DESCRIPTION

Introduction

Figure 1:
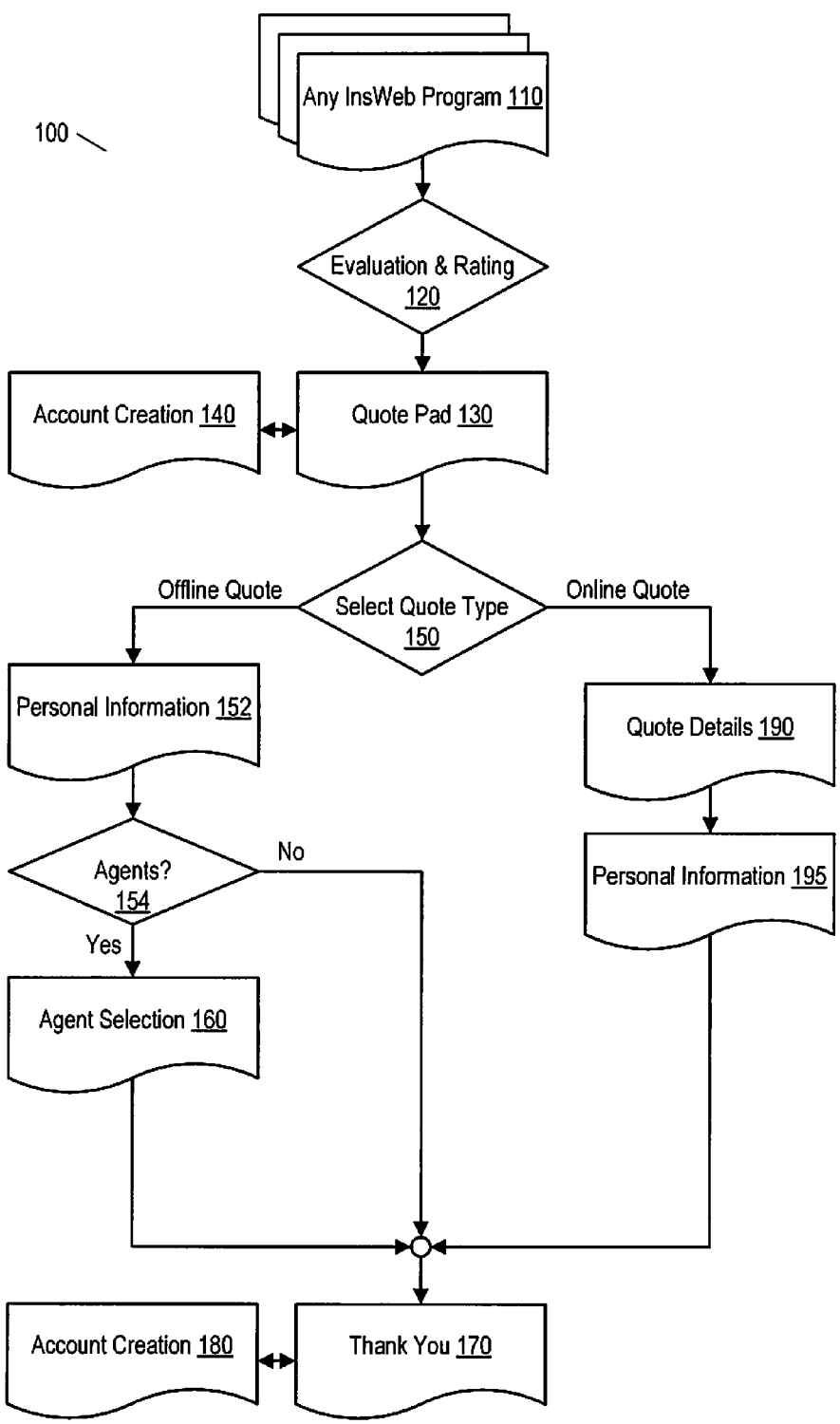
FIG. 1 is a flow diagram of the operation of a prior art automated insurance quoting system.
Figure 2A:
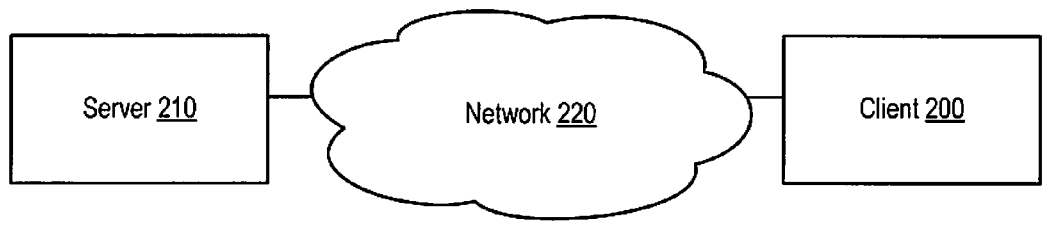
FIGS. 2A and 2B are a high-level schematic view of a client-server computer system according to one embodiment of the present invention.
Figure 2B:
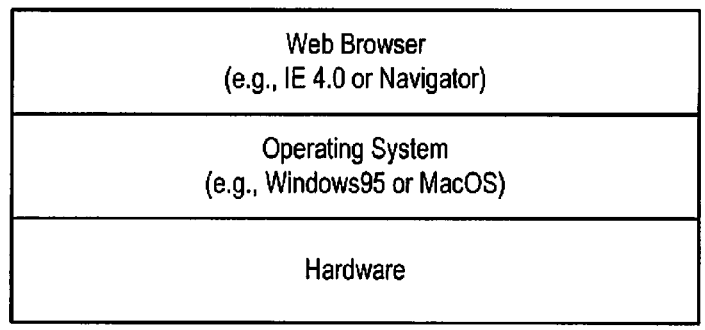
Figure 2C:
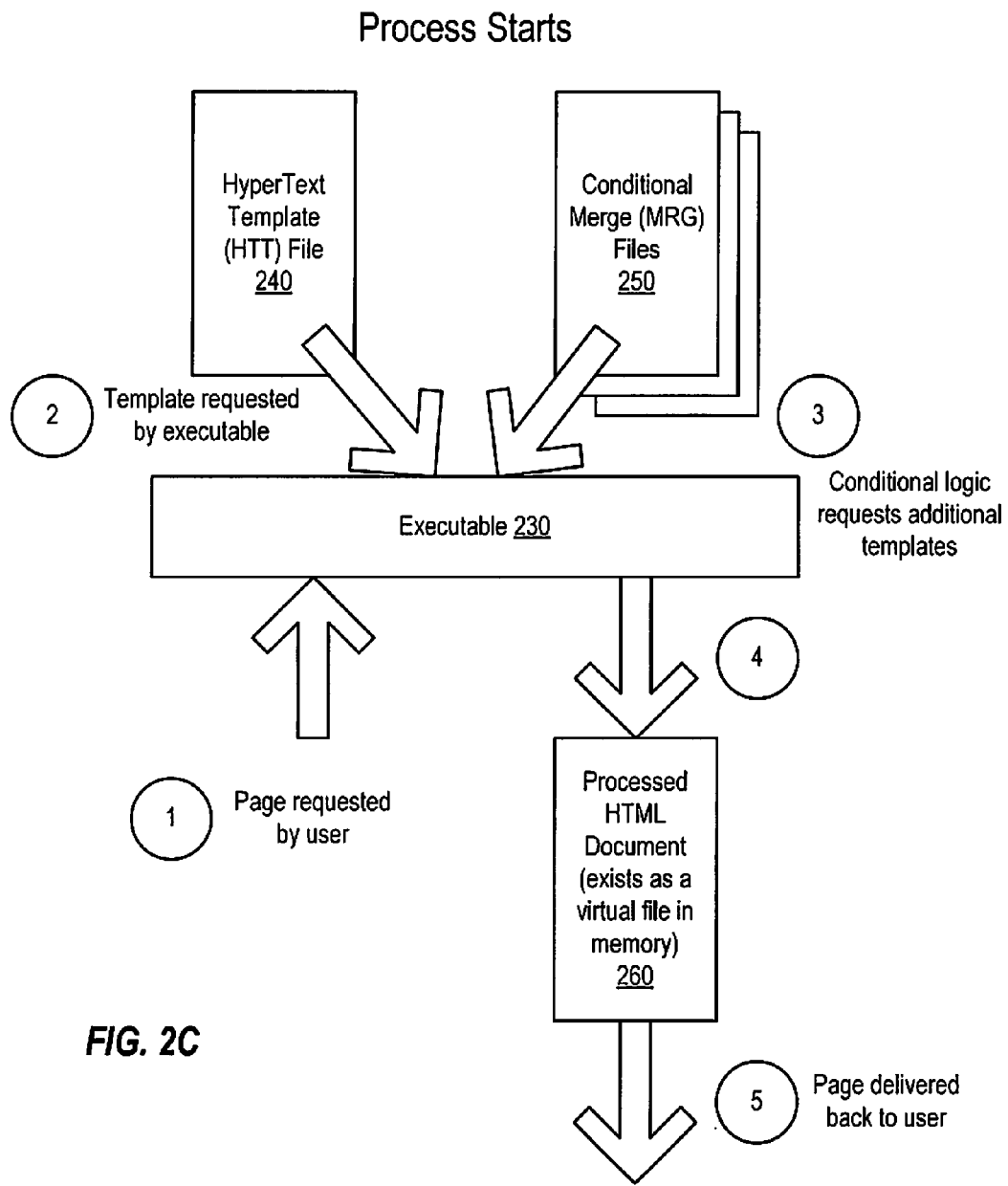
FIGS. 2C and 2D illustrate the operation of a computer system according to one embodiment of the present invention.
Figure 2D:
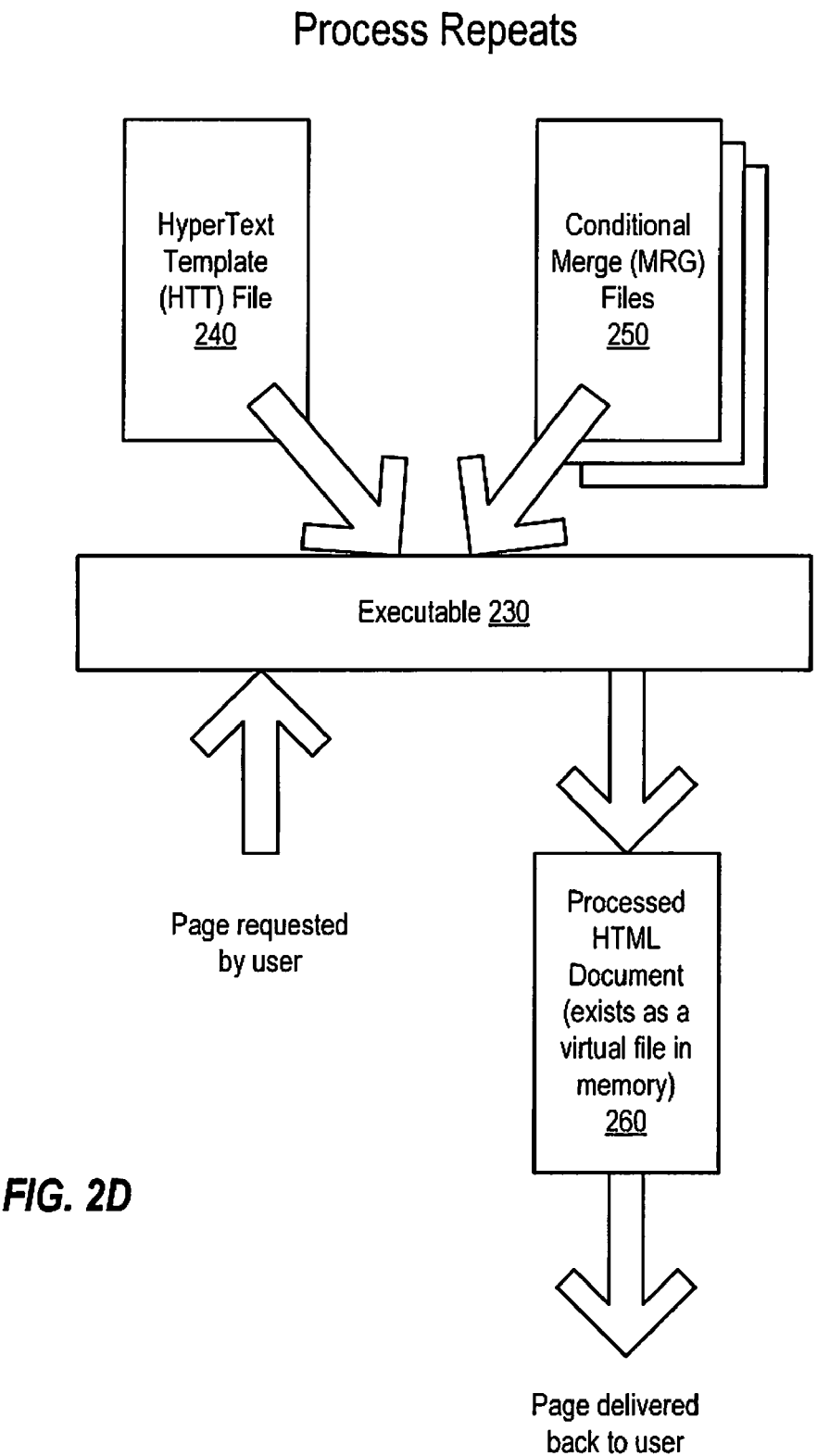

One implementation of a computer system according to an embodiment of the invention is described in FIGS. 2A and 2D. FIGS. 2A and 2B illustrate a client computer 200 executing a web browser program connected to a server computer 210 over a global network 220 such as the Internet and/or the web. FIG. 2B illustrates the logical structure of the hardware and software of client computer 200. In FIG. 2B, a web browser program such as Internet Explorer 5.0, available from Microsoft Corporation of Redmond Wash., or Netscape Navigator® 4.0, available from Netscape Communications Corp. of Mountain View, Calif., is shown executing on top of an operation system such as Windows95®, Windows98®, Windows NT® 4.0, available from Microsoft Corporation of Redmond Wash., or MacOS™ 8.5, available from Apple Computer, Inc. of Cupertino Calif. The operating system is, in turn, executing on top of the actual hardware of client computer 200 (FIG. 2A).

FIGS. 2C and 2D illustrate the operation of the software program executed by server computer 210. As shown in FIG. 2C, a user accesses the automated insurance quoting system by first requesting the "home page" of the automated insurance quoting service via client computer 200 connected to server computer 210. An executable program 230 running on server computer 210 then retrieves a hypertext template (HTT) file 240, also stored on the server computer, and one or more conditional merge files 250. Conditional merge files 250 store information such as individual insurance companies' value propositions or state-specific or partner-specific information that is dependent on other data previously entered by the consumer that may vary within an HTT file 240.

Executable program 230, HTT file 240, and conditional merge files 250 are protected by means of a network firewall installed on server computer 200 to prevent unauthorized access to sensitive information such as insurance rating information. Executable program 230 then merges HTT file 240 and merge files 250 to generate processed HTML document 260, which is then displayed on a screen of client computer 200.

FIG. 2D illustrates how the user accesses additional pages in a similar manner to the manner shown in FIG. 2C.

MacOS is a trademark of Apple Computer, Inc. of Cupertino, Calif., Windows95, Windows98 and Windows NT are registered trademarks of Microsoft Corporation of Redmond, Wash., Netscape and Netscape Navigator are registered trademarks of Netscape Communications Corp. of Mountain View, Calif.

The enhanced intelligent user interface for on-line requests or applications of the present invention consists of several elements, including a virtual application and a database. The virtual application is actually a set of logical forms, where each logical form presents information to and queries the user (i.e., the applicant for services or the requestor of data and/or products) for certain input information. These logical forms are comprised of hypertext template files and conditional merge files that are processed as described above to produce an HTML document that is displayed to the user in a conventional browser window. The database, which is not directly presented, contains both the information input by the user and error checking parameters used to determine if the user has mis-entered or failed to enter data. The database, which may be any conventional database including but not limited to computer codes for the generation of dynamic web pages using a mixture of static and dynamic data elements, provides the text and graphics (if any) used to query the user for information in each logical form.

In one embodiment of the present invention, the database and other elements of the software program executed by server computer 210 are written in the C++ programming language. One of ordinary skill in the art of course recognizes that other programming languages, including but not limited to Java and hypertext markup language (HTML) may be used. Accordingly, the present invention is not limited to any one form of programming or hypertext markup language.

Figure 3:
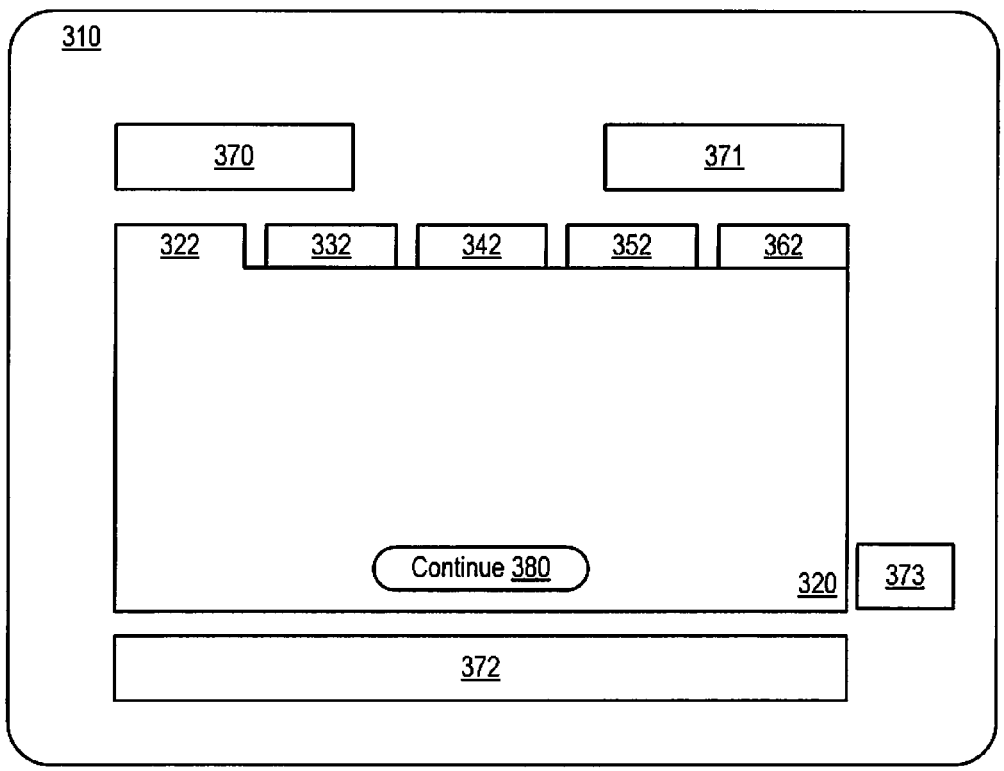
FIG. 3 is a schematic illustration of a web browser displayed page according to one embodiment of the present invention.

In one embodiment of the present invention, the virtual application is presented by the intelligent user interface as a web page containing a number of tabbed panes. FIG. 3 shows an example of such a presentation. Web page 310, as displayed by a conventional web browser, consists of displayed pane 320 and its corresponding tab 322. Each pane represents a logical form within the virtual application. Also displayed are tabs 332, 342, 352, and 362, each corresponding to a different logical form pane in the set of logical forms that define the entire virtual application.

The display also includes quasi-static elements 370-373, which do not necessarily vary with changes in the displayed pane. For example, advertising banner 371 may be static, animated, or variable depending on user information as conventionally seen in the web art.

Each tabbed pane may require several browser screens of data to present the necessary queries and information relating to the logical form. Each screen or frame of data is referred to here as a sub-pane. A "Continue" button 380 (where present) prompts the user to step to the next sub-pane of information in the logical form. As will be appreciated by one of ordinary skill in the art, tabs 322, 332, 342, 352, and 362 and the Continue button 380 are all associated with hyperlinks that cause the display of a new data in displayed pane 320. One of ordinary skill in the art will further appreciate that this new display may be performed by any of several well-known web programming techniques, including but not limited to framing displayed pane 320 or another sub-pane of displayed pane 320 within web page 310 or rendering an entirely new web page 310 containing a new sub-pane and some or all of the quasi-static elements 370-373 previously displayed.

Not only are the queries and information in each pane and sub-pane of a logical form dynamically determined based on user input information, but the tabs themselves (both the quantity of panes and the name of each pane) can be self-configuring based on the user input. For example, in a case where the virtual application is an on-line application for auto insurance, the applicant's state of residence is used to determine if one or more affinity discounts may be available. Accordingly, once the applicant enters his or her state of residence in the appropriate logical form, the process determines if an affinity discount is available in that state and displays a new tab (and thus a link to a new logical form pane) entitled, in one embodiment of the present invention, "Discounts." Selection of the Discounts tab will then display a new pane containing information and/or queries to determine applicant eligibility for a discount.

Although pane navigation tabs are described as located on the top edge of the pane, those skilled in the art will realize that such tabs may be placed anywhere within displayed web page 310. In particular, but without limitation, tabs may be placed along any outer edge (top, bottom, or either side, or any combination thereof) of displayed pane 320. Additionally, tabs may be displayed on any inner edge of combination of inner edges of web page 310, all of which placements are commonly known and used in the web arts. Accordingly, the invention is not limited to any particular type of tab placement.

Furthermore, while a tab iconography is described herein, one of ordinary skill in the art can readily set that any number of icons or symbols representing a one-of-many selection, such as exclusive check boxes or radio buttons, may also be employed instead of or in combination with the presently described tabs. Accordingly, the invention is not limited to any particular type of tab iconography.

Figure 4A:
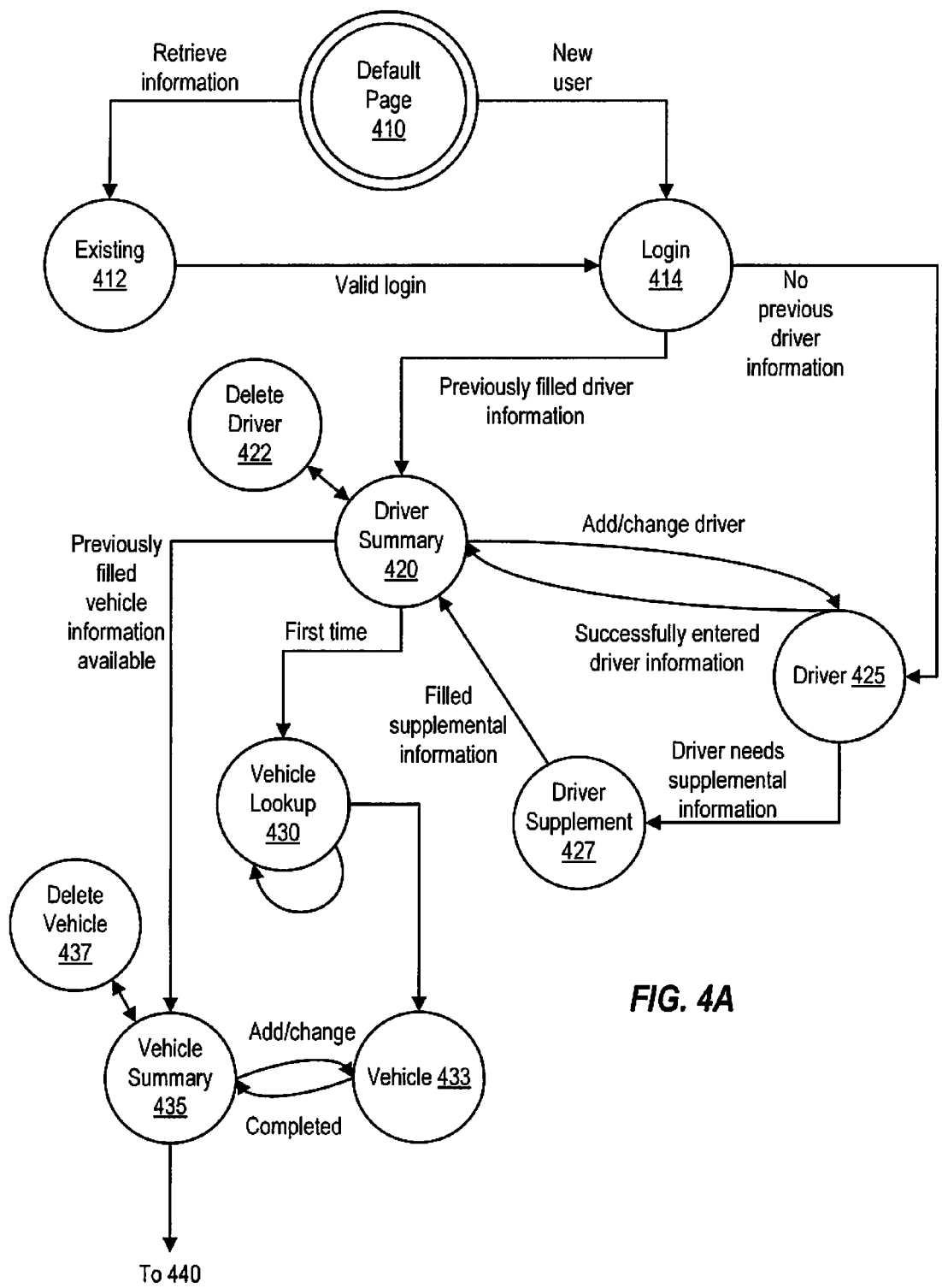
FIGS. 4A and 4B are state diagram of a virtual application process according to one embodiment of the present invention.
Figure 4B:
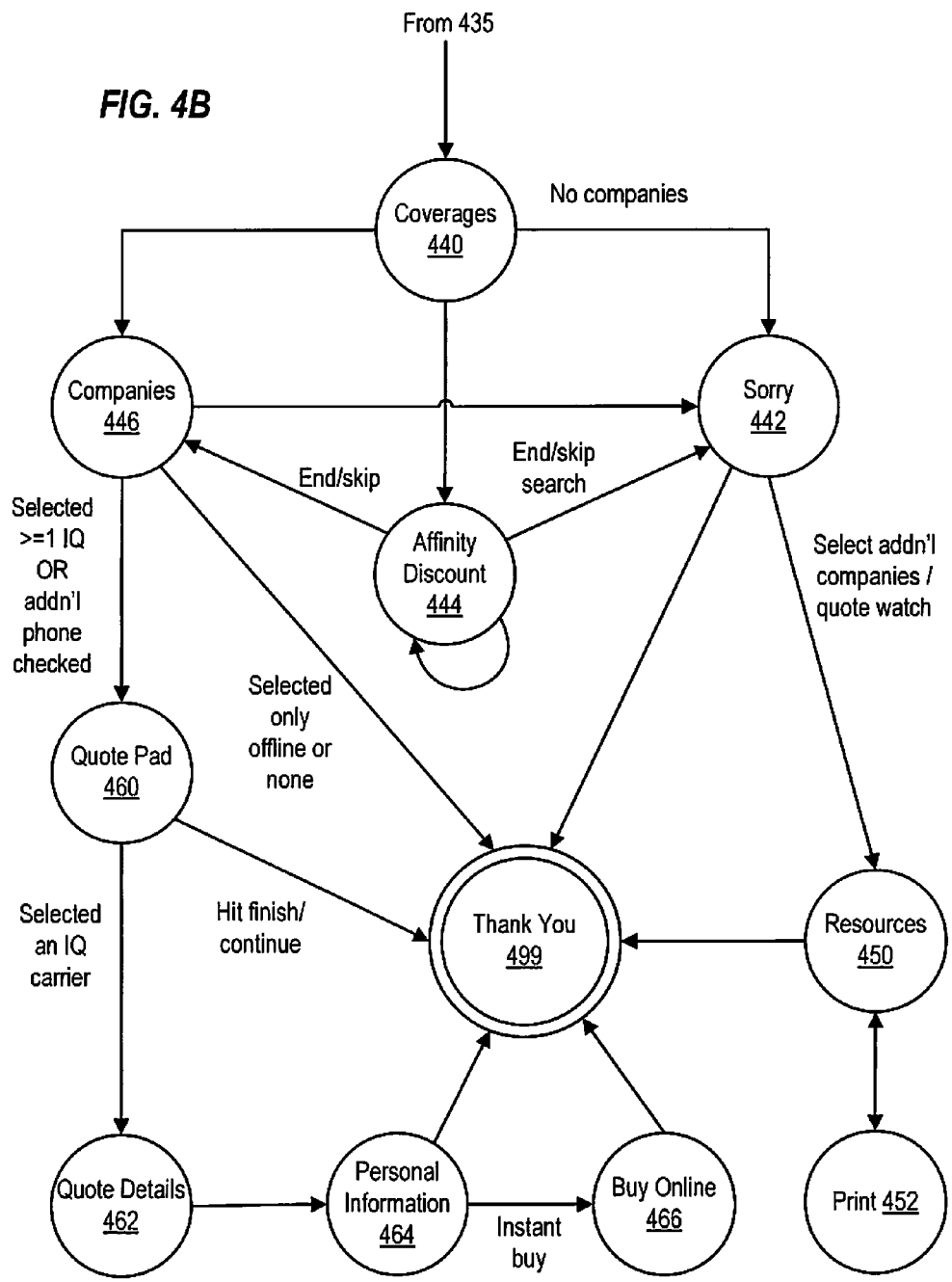

FIG. 4 shows a state diagram representing the progress of an applicant/user through a virtual automobile insurance application according to some embodiments of the present invention. (For clarity of presentation, FIG. 4 is split into two parts, 4A and 4B).

The process begins from the default (Start) page 410. The user either retrieves his or her previously stored information as a returning (existing) user 412 or logs in 414. The login process 414 for new users includes display of the State pane and querying the user for state of residence information.

If an existing user is returning to complete an application (or to continue comparison shopping for quotes), the driver summary sub-pane 420 (within the Driver(s) pane form set) is displayed. The user may either delete a driver 422, add or change driver information 425, or proceed to the vehicle information form set 430 or 435 (further discussed below).

If there is no previous driver information in the system, as in the case of a new user, the initial Driver(s) pane 425 is displayed and the user is queried to enter his or her driver information. Once all driver information is successfully entered, the driver summary sub-pane 420 is displayed. If supplemental information on a driver is needed, a driver supplement sub-pane (or panes) 427 is displayed.

When the user selects the Continue button from the driver summary sub-pane 420 (or if the "Vehicle" tab is selected), the vehicle summary sub-pane 435 is displayed if information on at least one vehicle is found in the database. The user then has the opportunity to delete a vehicle 427, add or change vehicle information 433 or proceed to the coverages pane 440.

If no vehicle information is in the database (i.e., it is the first time that the user has reached this part of the application process), the vehicle lookup sub-pane 430 is displayed to query the user for type of vehicle. This process is iterative for however many vehicles the user wishes to insure. Specific vehicle information (e.g., model year, and accessories) is queried in Vehicle sub-pane(s) 433.

The Coverages tab and associated pane 440 allows the user to select from a variety of offered insurance coverage for the driver(s) and vehicle(s) specified. However, if the user's selections and supplied information do not match the offerings of any company, a "Sorry" message 442 is displayed. At this point, the user can either exit to the "Thank You" sub-pane 499 or select additional companies and/or activate a QuoteWatch feature that monitors changes in insurance company offerings for products that match the user's needs. The latter choice provides a list of resources 450 to the user and supports printing 452 of that list.

Figure 14:
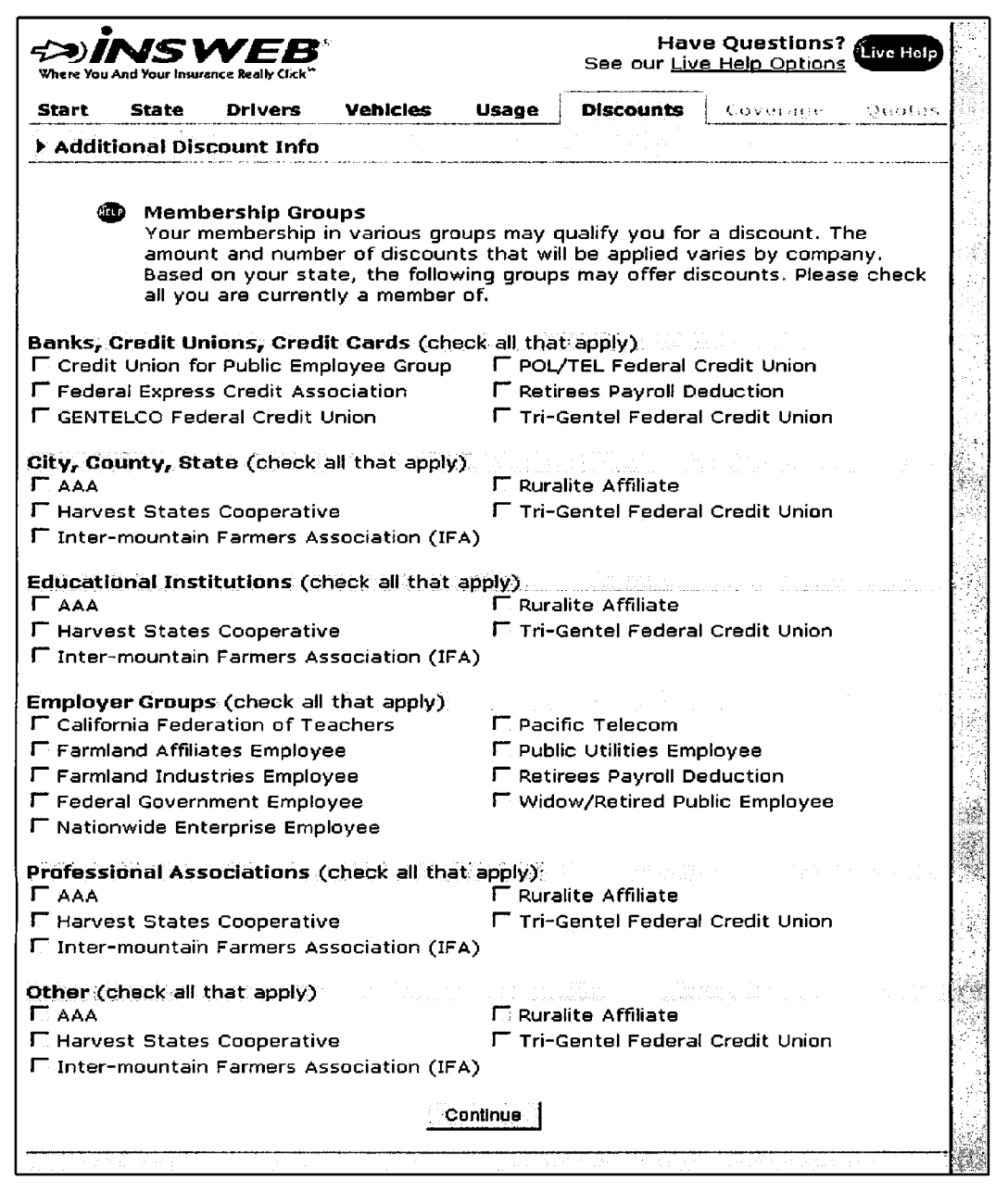

Returning to Coverages pane 440, several other possible conditions must be considered. If the user is in a state that affords affinity discounts, the Discounts tab 444 is displayed and the user is queried for discount eligibility according to his or her membership in certain enumerated affinity groups, such as those listed in FIG. 14. This process is iterative for all affinity groups to which the user may belong. When the user chooses to leave the affinity Discount pane, or if the user does not belong to any of the listed affinity groups, the process displays a list of companies offering insurance products matching the user's needs 446 or the Sorry message 442.

Depending on whether the user selects companies offering on-line quotes or off-line quoting companies (or no companies at all), the process next displays either quote pad 460 or Thank You sub-pane 499. From quote pad 460, the user may either view quote details 462 or conclude the process at Thank You sub-pane 499. The user viewing quote details 462 may also choose to enter sufficient personal information 464 to "Instant Buy" (purchase) the selected insurance coverage on-line 466.

Prior Art On-line Applications

Several on-line applications are currently available, including those of InsWeb Corp., QuickenInsurance$^{sm}$, eCoverage, esurance, Quicken.com, E-LOAN, and Amazon.com. While several offer graphical elements that look like tabs for triggering hyperlinks to other pages, questions, or data presentation relative to an on-line application for a service, all lack the enhanced user navigation capability provided by the present invention. In particular, while some application data state is preserved from page to page, the prior art lacks the ability to support arbitrary re-entry of application panes and sub-panes, dynamic pane and sub-pane customization dependant on user input, and real-time error flagging and guided user correction.

Representative Embodiment: Auto Insurance Virtual Application

Although a virtual automobile insurance application is described, those skilled in the art will realize that virtual applications other than those for auto insurance or even insurance can be created according to the presently disclosed invention. Accordingly, the invention is not limited to any particular type of insurance application or to applications for a service at all. Virtual, on-line applications for apparatus, product, or materials fabrication or delivery, as well as requests for any type of service to be performed are all equally within the scope of the present disclosure.

Figure 5:
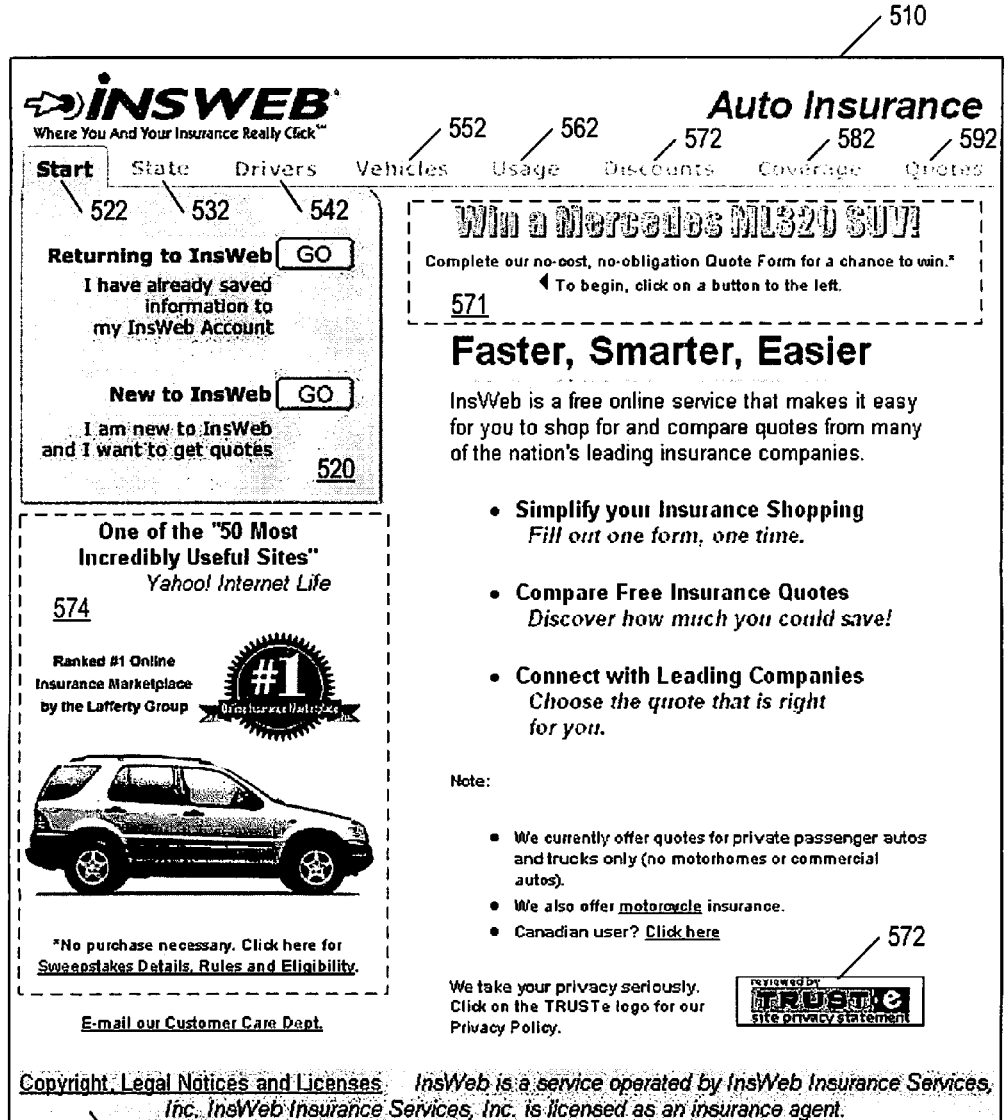
FIG. 5 is a screen shot of the Start pane of an intelligent user interface according to one embodiment of the present invention.
Figure 7:
Figure 8:
Figure 12:

FIG. 5 shows a web page 510 containing the default or "Start" pane 520 of a virtual application for auto insurance coverage from an on-line insurance quote system such as that offered by InsWeb Corporation. There are eight tabs 522, 532, 542, 552, 562, 572, 582, and 592 in the auto insurance virtual application: Start, State, Drivers, Vehicles, Usage, Discounts, Coverage, and Quotes (respectively). With the exception of the Discounts tab 572, all the tabs will appear at the top of the page while the user is in the auto application. The functionality of the Discounts tab 572 is discussed below.

Each form set in the auto insurance virtual application is associated with a specific tab and therefore displayed in a separate pane. In the example of FIG. 5, the form set for the start tab is small and is completely displayed in pane 520. The rest of web page 510 (i.e., other than the tabs and pane 520) consists of quasi-static elements such as sweepstakes advertisement 571, Trust.e certificate 572, legal and copyright notice 573, and promotion 574.

As can be seen from this example, the pane and its associated form set can be of any physical size relative to the displayed web page. Here, Start pane 520 is a small subset of the area of web page 510. As will be seen in the examples that follow, a pane may also consume of all of the area of web page 510 and, in addition, requires several sub-panes each also filling web page 510 in order to present the complete form set for that pane.

FIGS. 6 through 16 show the panes corresponding with each tab, and (where applicable) the sub-panes used to display and gather additional information, according to one embodiment of the present invention. Multiple sub-panes are provided for some of the longer form sets; see, e.g., FIGS. 9, 11, and 13.

Dynamic Tabs

Affinity discounts are currently only available in certain "affinity" states. Therefore, users (also referred to as consumers) in non-affinity states do not need to see the Discounts tab. The Discounts tab is dynamically controlled so that it only appears to user/applicants who are in affinity states. Since the process cannot determine the Policy State (i.e., the geopolitical, as opposed to logical, state in which the policy will be issued) until the State pane has been completed, the process cannot show the Discounts tab to any users until after the State page is displayed and completed.

Procedurally, the decision logic behind the dynamic display of the Discount tab, and indeed any tab whose appearance is determined by user input or action, is as follows:

1. Do not display the Discounts tab on the Start or State pages.
2. If the consumer selects an affinity state on the State page (i.e., in the State pane), include the Discounts tab on all subsequent pages where the tab navigation bar is displayed.
3. If the consumer selects a non-affinity state on the State page, do NOT display the Discounts tab on subsequent pages.
4. If the consumer clicks on the Continue button or Returning User button on the Start page, evaluate the state the consumer previously selected on the State page to determine whether or not the Discount tab will be shown.
5. This affinity state verification process should occur every time a consumer changes the criteria used, to determine the Discount Tabs presence. This ensures proper performance if the consumer changes their Policy State multiple times during the same shopping session.
6. If the consumer changes from a state that had affinity programs to a state that has no affinity programs, whatever affinity group data the consumer previously entered should be discarded.
7. If the consumer changes from a state that had no affinity programs to a state that has affinity programs, the new tab will appear and the consumer will proceed through the page in the normal course of events. Do not force the consumer to the Discounts page via error processing because this particular set of data is optional.
8. If the consumer remains in the same state but InsWeb has added a Discount tab in that state, the process will behave as if the consumer changed to a state that has affinity programs.
9. If the consumer remains in the same state but InsWeb has removed the discount tab in that state, the process will behave as if the consumer changed to a state that does not have affinity programs.
10. If the consumer remains in the same state but InsWeb has added or deleted affinity group programs from that state, without changing whether or not the tab appears, the consumer will not be forced to go back to the Discounts pane as the page is optional and any groups that no longer apply to this user would have been discarded.

Tab Navigation

Tabs do not provide true random access to information; access is still constrained somewhat by linearity of the application process as driven by its internal data dependencies. However, tabs will allow the user much more flexibility in navigation once the core information is provided. In general, a user cannot access a tab if they have not successfully completed all previous tabs but the user can access tabs that have already been successfully completed.

Table 1 describes possible tab states for each tab and the associated actions available in each state.

TABLE 1

| Tab State | Description | Clickable/Not Clickable |
| --- | --- | --- |
| Active | User has successfully completed all sub-panes within the tab. | Clickable. User can click on tab and access sub-panes. |
| Active and Current | User is in the process of filling out sub-pane(s) within the tab. | Not Clickable. If user is filling out sub-panes within current tab, clicking on the tab should not re-post form data. |
| Inactive 1 | Not accessible to the con- | Not Clickable. |

TABLE 1-continued

| Tab State | Description | Clickable/Not Clickable |
|---|---|---|
| | sumer. | |
| Inactive 2 | Not accessible to the consumer; however an adjacent tab to the left is in an Active, Active and Current, or Active and Error state | Not Clickable. |
| Active and Error | Consumer has an error on one or more sub-panes within a tab. | Not Clickable. If user is correcting a sub-pane within tab, clicking on the tab should not re-post form data. |

In one embodiment of the present invention, a consumer is not permitted to submit two Requests for Quotations (RFQs) in the same product during a shopping session, even if the consumer wants to submit a RFQ to a different carrier. Therefore, when displaying the Quote Thank You page at the end of the process, the process will not make it easy for the consumer go back and re-submit quotes. The consumer would only be frustrated with an "Our records show you have already submitted an RFQ" error message that prevents him or her from further shopping.

At this point, all tabs on the (online) RFQ Thank You page are disabled. The Quotes tab remains Active and Current. The only action the consumer can take from the Thank You page is to click on the "Shop for more Quotes" button (or use their browser's Back button).

For the Thank You pages that are displayed when a consumer only has offline quotes or no quotes (Offline Thank You, General Thank You, and Sorry Thank You), no tabs are disabled.

In an alternate embodiment of the present invention, multiple requests for quotes are allowed and prior tabs are therefore not disabled. In this embodiment, an additional data state is created based on the original state and including the revised data supplied by the user.

Subject to error processing described below, clicking on a completed tab (i.e., a tabbed pane for which all sub-panes representing the entire associated form set have been completely filled out) takes the consumer to the selected tab.

Clicking on the Continue button in a sub-pane (page) takes the user to the next logical page within the virtual application.

The most important aspect of the user interface of the present invention is not that it has tabs or that it enables a certain amount of non-sequential (non-linear) access to the various form sets within a virtual application, but that it maintains data state across all panes. As well known by those of ordinary skill, the Internet and web pages in particular are essentially stateless: no memory (or at most very little, such as the last page or pages visited) is preserved upon hyperlinking from one page to another. Prior art on-line forms have cached limited information either on the client or host server machines so that a form spanning several pages may be completed. Such caching has been limited to discrete, user-supplied information rather than including virtual application status and data dependencies as is provided by the present invention.

In contrast to the prior art, the present system, in all its embodiments, maintains virtual application information, relative dependencies, and information context obtained and/or derived from each pane accessed by the user/applicant. This state maintenance enables use of standard browser Back and Forward button functions without loss of data and without losing the user's "place" in the application process. A user can therefore "back up" one or more sub-panes or panes (i.e., switch to a logically "earlier" tab) and correct or change a data entry without having to re-enter any data from that earlier point forward to the point at which the user jumped back.

Consider the following example; a virtual application consists of five logical form sets presented in tabbed panes labeled (in logical order of completion) A, B, C, D, and E. Assume that the user has completed tabs A, B, C, and D and is viewing tab E. Assume further that the user now realizes a piece of information in tab B must be changed. According to one embodiment of the present invention, she can click on tab B, change the information, and use the conventional browser Back button to return to tab E. Alternatively, the user can simply select tab E directly while viewing tab B and return to where she left off in tab E without any loss of data or the need to re-enter information.

While this sound intuitive, it is in fact impossible under the prior art because the data entered in tabs C, D, and E (if any) will have been expired (i.e., erased and thus lost) by the act of switching to the tab B environment. Data may be lost due to insufficient page cache resources on the server or client computers or due to security restrictions set by either the user or a system administrator. As an example of the latter situation, the well-known Internet Explorer browser version 5.0 for the Macintosh automatically erases (i.e., deliberately does not cache) secure web pages so that the Back button always returns a blank (unfilled) form, rather than the previously filled-in one.

Dynamic Error Trapping and Handling

Figure 17:
FIG. 17 is a screen shot of a pane containing a flagged error according to one embodiment of the present invention.
Figure 18:
FIG. 18 is a screen shot of a pane containing a flagged error according to an alternate embodiment of the present invention.

In general, the present invention approaches error correction by actively walking the user/applicant/consumer through the pages that need to be corrected rather than have the consumer walk themselves through the error correction process. FIG. 17 shows an example of a pane containing an error (an "errored pane"). Indicator 1710 shows, in a contrasting color in one embodiment, that an error is present. FIG. 18 shows an alternate method of altering an error by using error icon 1810.

In the current art, if a consumer makes an error on a page of a virtual application, they have to backtrack to the point of the error and then progress through the application again, linearly, from that point until the end, even through pages that do not have errors. Using the tabbed pane and intelligent user interface of the present invention, the user can be directed to only the pages that need to be corrected. The consumer can then choose where they want to go after error correction is complete.

How errors are processed depends on where the consumer is in the application and whether they want to progress forward from the tab they are on or backward after they make (and correct) an error. For error processing, five state definitions are required:

Previously Completed Backward Tab=Tab that user at one time completed successfully. In the tab order, this tab resides behind the tab the consumer is currently accessing.

Previously Completed Forward Tab=Tab that user at one time completed successfully. In the tab order, this tab resides in front of the tab the consumer is currently accessing.

Previously Completed Forward Page (or sub-pane)=Page (sub-pane in the current pane or tab) that user at one time completed successfully. In page order, this page resides in front of the page the consumer is currently accessing. This page can either be under the same tab that consumer is accessing or under a Previously Completed Forward Tab.

Initiating Tab=The Active and Current Tab when user clicks on a Destination Tab.

Destination Tab=The previously completed forward tab that the user has clicked on.

If the consumer clicks on a previously completed forward page, the process will re-validate all pages between the page the consumer is on in the initiating tab and up to, but not including, the first page of the destination tab. It is understood that this will have a performance impact, but that is preferred to the impacts of not having a fully complete set of data at time of quote and/or lead submission at the end of the virtual application process.

Table 2 shows a chart of tab navigation states in the presence of errors.

TABLE 2

| Scenario | Consumer Clicks On | Error Trap Action |
| --- | --- | --- |
| Consumer enters erroneous data on a page within a tab that has not been previously completed | Continue | Present errors to consumer on page they are accessing. |
| | Previously completed backward tab | Presents errors to consumer and display "Warning" message box. |
| | Previously completed forward tab | There are no forward tabs available in this scenario. (They are disabled.) |
| Consumer changes information within a previously completed tab, causing an error on that page | Continue | Present errors to consumer on page they are accessing. |
| | Previously completed backward tab | Present errors to consumer and display "Warning" message box. |
| | Previously completed forward tab | Presents errors to consumer on page they are accessing. |
| Consumer changes information within a previously completed tab, causing an error (or errors) on other previously completed forward pages | Continue | Take consumer to the next logical page in the application. |
| | Previously completed backward tab | Save consumer's changes and take consumer to the backward tab. |
| | Previously completed forward tab | Take consumer to the first previously completed forward page in the application with errors (potentially skipping pages without errors). This may or may not be within the tab clicked on. |
| Consumer enters erroneous data on a page within a tab that has not been previously completed. | Continue | Presents errors to consumer on current,active page. |
| | Previously completed backward tab | Presents errors to consumer and display "Warning" message box. |
| | Previously completed forward tab | There are no forward tabs available in this scenario. (They are disabled.) |
| Consumer changes information within a previously completed tab, causing no errors. | Continue | Take consumer to next logical pane or sub-pane (page) in the application. |
| | Previously completed backward tab | Take consumer to first page in the tab pane clicked on. |
| | Previously completed forward tab | Take consumer to first page in the tab pane clicked on. |

In some embodiments, if erroneous data is entered in a sub-pane or pane (page), or if newly entered data exposes previously entered data as erroneous, the tabs representing panes with errors are highlighted in a special color or otherwise distinguished from completed tabs as by animation of shading. If errors occur on multiple tabs, all errored tabs are not highlighted as Active and Error at the same time. Rather, the user is stepped through the errored tabs to correct the errors highlighted in each pane or sub-pane, one at a time. The tabs that are yet to be corrected will remain in the Error color until corrected.

All existing data dependencies will remain in place (with existing validation and error messaging unless otherwise specified), including, for example, but not limited to the following in the context of an on-line auto insurance application:

State Change->(determines) Vehicle Garage City/Zip/State, Coverages

Add Driver->Usage

Add Vehicle->Usage, Coverages

Current Date->Coverage Effective Date

Spouse Licensed->Spouse Included

The purpose of the "Warning" message box discussed in Table 2 is to let the user know that they are will lose data on the current, Active page if they go back to a previously completed tab and to give the user the chance to complete the current page and/or fix the errors. In an alternate embodiment, the current consumer data is temporarily saved (and not lost) before jumping to a previously completed backward tab, thus eliminating the need to display the Warning message entirely.

Warning message operation in the context of selecting a previously completed backward tab is summarized as follows:

The page the user created the error on is reloaded with conventional error messaging and flagging, such as by highlighting, animating, or coloring erroneous entries or inserting error messages. The erroneous data is re-displayed on this page.

After the page with error is rendered, the Warning message box appears.

If the user clicks on the "OK" button in the Warning message box, the user will lose the changes they made on the current page and be taken to the tab section they clicked on. The message box will disappear.

If the user clicks on the "Cancel" button in the Warning message box, the box will disappear and the user will be able to correct the information on the currently active page.

The process continues until the consumer corrects all information or clicks on the "OK" button in the Warning message box.

For users with browsers that cannot support conventional message box (pop-up) display technology (presumably a very small percentage of all browsers), the process automatically displays the active page with conventional error messages but without further explanation explanation.

Navigation Flowchart

Figure 19:
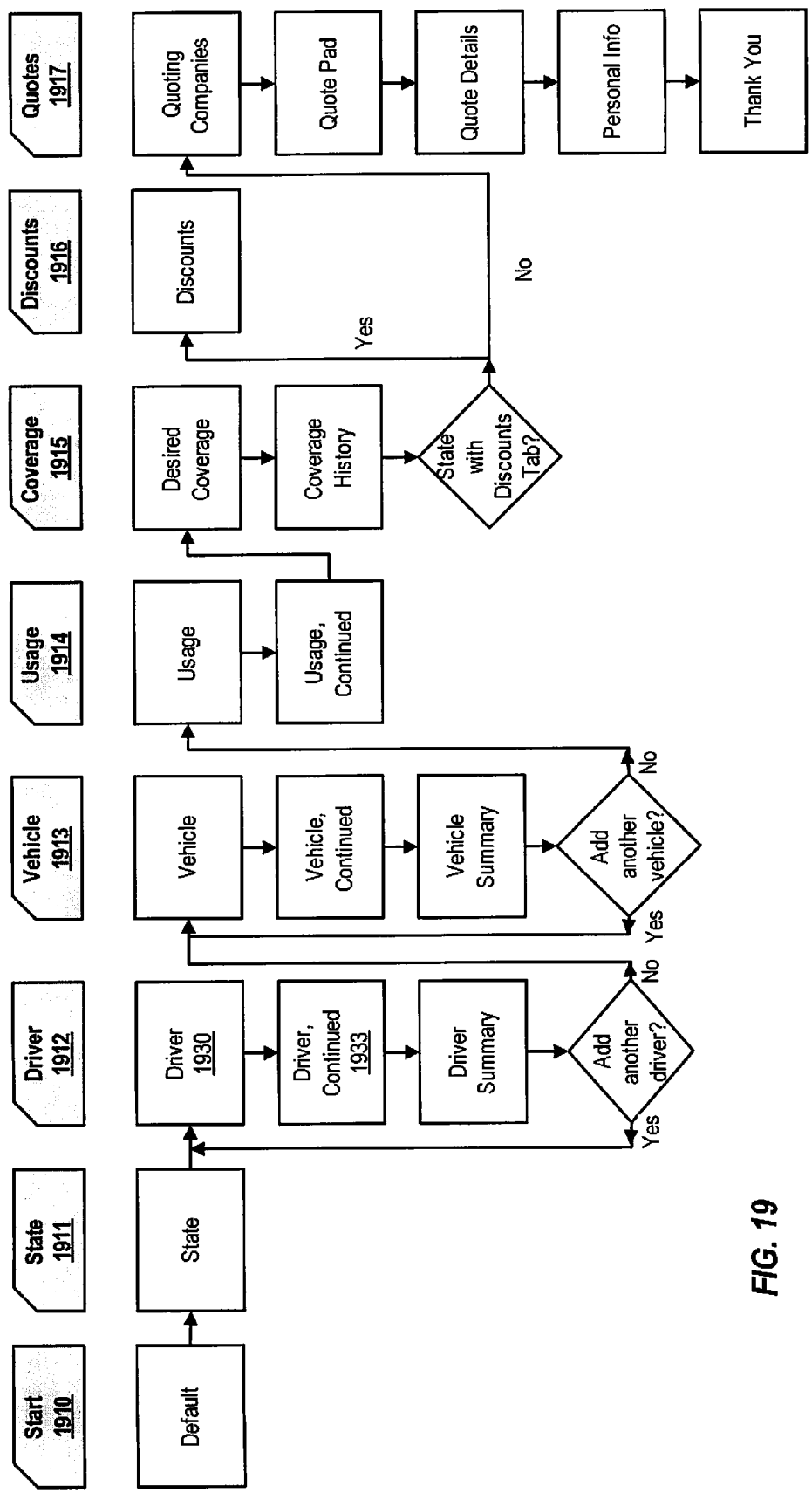
FIG. 19 is a high-level flowchart of a representative virtual automobile insurance application, according to one embodiment of the present invention.

The overall virtual application flowchart for an on-line automobile insurance quote is presented in FIG. 19. Grey card icons 1910-1917 represent the eight panes discussed above. The white boxes, such as Driver 1930 and Driver, Continued 1933 represent the sub-panes (pages) displayed in sequence for each tab.

Virtual application processing flow may be better understood in light of the following terminology for users:

Tentative=Consumers who are within an InsWeb executable on-line application (including the application Start page) but have not logged in to an existing InsWeb account and have also not entered as a New User Uncommitted=Consumers who are within an InsWeb executable on-line application (including the application Start page) and have entered an application as a New User.

Committed=Consumers who are within an InsWeb executable on-line application (including the application Start page) and have logged into an existing InsWeb account as a Returning User.

The tabbed intelligent user interface is intended to streamline the flow of the on-line application process in at least three ways:

by parameterize the buttons on the application default (Start) page or pane based on determining if the user is "tentative", "committed" or "uncommitted" when they reach that page;

by showing all consumers the same default (Start) page regardless of what channel they have come from (i.e. Yahoo or a personal information manager [PIM] interface); and by actively depositing returning users to the most relevant page of the application based on what that user did in the application during their last visit (or lack of a last visit). For a returning user, it is desirable to help get them to where they need to go without having to step through the application linearly.

To determine which buttons to show the consumer on the application Start page, one needs to determine if the user is "Tentative," "Uncommitted," or "Committed" at the time they reach the default page. The intelligent user interface for any on-line application operating according to an embodiment of the present invention will thus have to understand the consumer's status before it can display the Start page.

For a "Tentative" user, the interface displays two button options on the Start page: New and Returning. The user will have to figure out if they are New users of the service or Returning users. For example: a consumer browsing the web enters an Auto Coverage Analyzer tool from the InsWeb Internet home page and has not previously entered a product application or logged into the site during that session. The consumer's status is "Tentative" because the consumer has neither logged in to an on-line application as a Returning User nor entered an application as a New User. Therefore, when the consumer clicks the "Get Auto Quotes Now" button from the tool, the Auto Insurance on-line application Start page will have both the New and Returning User buttons.

For the "Uncommitted" or "Committed" user, the interface displays only one button on the Start page, labeled "Continue." The Continue button contains, in some embodiments, animation to draw the user's attention. Once the Continue button is clicked, the word Continue changes to "Retrieving Info . . . " and the last completed page of that user's on-line application is displayed. In the case of an Uncommitted user, the Start page is displayed as that user will not have entered any application information for that particular type of service or product.

For example: a consumer has entered the Renter's Insurance on-line application as a New User. After completing the application, the user decides to shop for more quotes. She clicks a link to the Automobile Insurance on-line application. The Auto application Start page has only a "Continue" button on it because the consumer's status is "Uncommitted." If the consumer had logged in to the Renter's application as a Returning User and followed the procedure described above, the Auto default page would still only have had the "Continue" button because the consumer would have a "Committed" status.

Once it is determined that a user is Committed, Uncommitted, or Tentative, the interface process needs to determine what page of the application the user should be taken to. This will depend on which button the consumer chooses on the Start page, what the user did last in the application, if anything, and if they currently have errors they need to correct.

If the consumer chooses the New User option, the consumer will be presented with the first data entry page of the application. If the user chooses the Returning User option (or clicks on the Continue button), Table 3 describes the general rules that determine the first page at which the user will begin.

Note that input validation (error checking) needs to take place on all data to determine where to start the user in the application. If the user is going to be taken straight back to the quote pad (i.e., the Quote tab in the automobile insurance representative embodiment described above), application filtering and risk rating (as known in the insurance quotation art) would also have to occur prior to presentation of quotes.

TABLE 3

| Processing Determination | Result (User begins at . . . ) | Error Display |
| --- | --- | --- |
| User has never entered data for the application | First application data entry page | N/A |
| User was in application Filled out partially Returns with no errors | Next logical page that requires data entry | Upon checking the database, if page has zero fields completed, then error messages will not be displayed. Upon checking the database, if page has one or more fields completed, then error messages will be displayed. Fields that we default for the user don't count as "being completed" unless they are not committed to the database |
| User was in application Filled out partially or went all | First error page. | Errors will be displayed. |

TABLE 3-continued

| Processing Determination | Result (User begins at . . . ) | Error Display |
|---|---|---|
| the way to the Quotes tab User returns with errors | | |
| User was in application Went all the way to the Quotes tab User returns with no errors | First page under Quotes tab. | N/A |

Alternate Embodiments

Although a set of single tabs each accessing a single pane or set of sub-panes is described, those skilled in the art will realize that there is no fundamental limit on the tab/pane hierarchy. In fact, each tab could access a pane itself containing tabs for accessing further panes or sets of sub-panes, ad infinitum. Accordingly, the invention is not limited to a single tab/pane hierarchy but instead contemplates any hierarchical, hyperlinked, and/or ordered structure of data and/or queries presented using a web browser or similar device.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of providing an intelligent user interface to an on-line application comprising the steps of:
    furnishing a plurality of icons on a web page displayed to a user of a web browser, wherein each of said icons is a hyperlink to a dynamically generated on-line application form set, and wherein said web browser comprises Back and Forward navigation functionalities;
    displaying said dynamically generated on-line application form set in response to the activation of said hyperlink, wherein said dynamically generated on-line application form set comprises a state determined by at least one user input; and
    maintaining said state upon the activation of another of said icons, wherein said maintaining allows use of said Back and Forward navigation functionalities without loss of said state.

2. The method of claim 1, wherein said displaying said dynamically generated on-line application form set comprises combining information from a template file and either a database or a conditional merge file or both to form said dynamically generated on-line application form set.

3. The method of claim 1, wherein said dynamically generated on-line application form set comprises data and queries presented as part of a process for applying for a service.

4. The method of claim 3, wherein said service comprises property or casualty insurance, life insurance, or health insurance.

5. The method of claim 1, wherein said icons are depicted as tabs along one or more inner edges of said web page.

6. The method of claim 1, wherein said icons are depicted as tabs along one or more inner or outer edges of a frame displayed within said web page.

7. The method of claim 1, wherein said web page comprises quasi-static elements distinct from said dynamically generated on-line application form set, wherein said displaying said dynamically generated on-line application form set in response to the activation of said hyperlink affects the display of said quasi-static elements.

8. The method of claim 1, wherein said plurality of icons displayed on said web page is determined in part by said user input.

9. A computer system for providing an intelligent user interface to an on-line application, comprising computer instructions for:
    furnishing a plurality of icons on a web page displayed to a user of a web browser, wherein each of said icons is a hyperlink to a dynamically generated on-line application form set, and wherein said web browser comprises Back and Forward navigation functionalities;
    displaying said dynamically generated on-line application form set in response to the activation of said hyperlink, wherein said dynamically generated on-line application form set comprises a state determined by at least one user input; and
    maintaining said state upon the activation of another of said icons, wherein said maintaining allows use of said Back and Forward navigation functionalities without loss of said state.

10. The computer system of claim 9, wherein said displaying said dynamically generated on-line application form set comprises combining information from a template file and either a database or a conditional merge file or both to form said dynamically generated on-line application form set.

11. The computer system of claim 9, wherein said dynamically generated on-line application form set comprises data and queries presented as part of a process for applying for a service.

12. The computer system of claim 11, wherein said service comprises property or casualty insurance, life insurance, or health insurance.

13. The computer system of claim 9, wherein said icons are depicted as tabs along one or more inner edges of said web page.

14. The computer system of claim 9, wherein said icons are depicted as tabs along one or more inner or outer edges of a frame displayed within said web page.

15. The computer system of claim 9, wherein said web page comprises quasi-static elements distinct from said dynamically generated on-line application form set, wherein said displaying said dynamically generated on-line application form set in response to the activation of said hyperlink affects the display of said quasi-static elements.

16. The computer system of claim 9, wherein said plurality of icons displayed on said web page is determined in part by said user input.

17. A computer-readable storage medium, comprising computer instructions for:
furnishing a plurality of icons on a web page displayed to a user of a web browser, wherein each of said icons is a hyperlink to a dynamically generated on-line application form set, and wherein said web browser comprises Back and Forward navigation functionalities;
displaying said dynamically generated on-line application form set in response to the activation of said hyperlink, wherein said dynamically generated on-line application form set comprises a state determined by at least one user input; and
maintaining said state upon the activation of another said icons, wherein said maintaining allows use of said Back and Forward navigation functionalities without loss of said state.

18. The computer-readable storage medium of claim 17, wherein said displaying said dynamically generated on-line application form set comprises combining information from a template file and either a database or a conditional merge file or both to form said dynamically generated on-line application form set.

19. The computer-readable storage medium of claim 17, wherein said dynamically generated on-line application form set comprises data and queries presented as part of a process for applying for a service.

20. The computer-readable storage medium of claim 19, wherein said service comprises property or casualty insurance, life insurance, or health insurance.

21. The computer-readable storage medium of claim 17, wherein said icons are depicted as tabs along one or more inner edges of said web page.

22. The computer-readable storage medium of claim 17, wherein said icons are depicted as tabs along one or more inner or outer edges of a frame displayed within said web page.

23. The computer-readable storage medium of claim 17, wherein said web page comprises quasi-static elements distinct from said dynamically generated on-line application form set, wherein said displaying said dynamically generated on-line application form set in response to the activation of said hyperlink affects the display of said quasi-static elements.

24. The computer-readable storage medium of claim 17, wherein said plurality of icons displayed on said web page is determined in part by said user input.

* * * * *